United States Patent [19]

Schrader

[11] 3,755,217
[45] Aug. 28, 1973

[54] DIFUNCTIONAL AND TRIFUNCTIONAL POLYSILOXANES AS ADDITIVES TO LATEX FOAM RUBBER

[75] Inventor: David T. Schrader, Schenectady, N.Y.

[73] Assignee: General Electric Company, Waterford, N.Y.

[22] Filed: Oct. 14, 1971

[21] Appl. No.: 189,401

Related U.S. Application Data

[62] Division of Ser. No. 42,447, June 1, 1970.

[52] U.S. Cl. ... 260/2.5 L, 260/29.7 R, 260/448.2 R, 260/448.8 R, 260/723, 260/820, 161/67
[51] Int. Cl. ..................... C08d 13/08, C08d 13/10
[58] Field of Search.................... 260/2.5 L, 2.5 F, 260/2.5 P, 723

[56] References Cited
UNITED STATES PATENTS

| | | | |
|---|---|---|---|
| 3,255,140 | 6/1966 | Sinn et al. | 260/2.5 L |
| 3,422,038 | 1/1969 | Meyer | 260/2.5 L |
| 3,271,331 | 9/1966 | Ender | 260/2.5 F |
| 3,511,788 | 5/1970 | Keil | 260/2.5 P |

Primary Examiner—John C. Bleutge
Assistant Examiner—Morton Foelak
Attorney—E. Philip Koltos et al.

[57] ABSTRACT

A foam rubber backing for a carpet wherein the foam rubber has therein a trifunctional or difunctional polysiloxane selected from the group having the formulas:

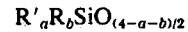

or

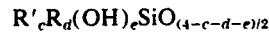

or

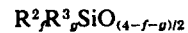

wherein R, R' R$^3$ are monovalent hydrocarbon radicals, R$^2$ is a monovalent hydrocarbon radical including a hydroxy radical, $a$ varies from 0.05 to 3.3 × 10$^{-5}$, $b$ varies from 2.05 to 2.00, $c$ varies from 0.05 to 3.3 × 10$^{-5}$, $d$ varies from 1.91 to 2.00, $e$ varies from 0.14 to 9.9 × 10$^{-5}$, $f$ varies from 0.25 to 1.9 × 10$^{-4}$ and $g$ has the value of 2.00. The liquid polysiloxane may be added to the rubber latex in the form of an emulsion having a nonionic or anionic type of surfactant therein.

2 Claims, No Drawings

DIFUNCTIONAL AND TRIFUNCTIONAL POLYSILOXANES AS ADDITIVES TO LATEX FOAM RUBBER

This application is a division of copending application Ser. No. 42,447, filed June 1, 1970.

BACKGROUND OF THE INVENTION

The present invention relates to polysiloxanes and in particular to polysiloxanes applied in an emulsion form to aqueous latex emulsions of synthetic or natural rubber to control foaming when such a latex emulsion is used to produce latex rubber foam backing for carpets.

Presently common types of carpets in use comprise a fabric base with erect yarn tufts extending upwardly from the base and forming the pile. There are various methods for forming the base and sewing the pile yarns to it. In one such method tufted carpets are formed with a woven backing, usually jute, with loops of yarn pushed through the jute to form the tufts. The pile yarns may be secured to the woven backing with a primary adhesive backing such as a rubber latex. A secondary backing may then be applied to the primary backing to provide additional strength to the backing and protect the latex and pile yarns from rubbing. Carpets such as the above are usually placed over a foamed rubber covering which is placed adjacent to the floor. Carpets are also constructed by foaming the foam rubber underlay material to the primary backing of the carpet. Such a carpet construction eliminates the need for a secondary latex backing as well as the separate foam rubber underlay. However, such carpets are plagued by delamination and shredding between the carpet backing and the foamed rubber underlay after the carpet has been used for an extended period of time. The delamination and shredding was caused by the samll degree of cohesion in the foam rubber itself and adhesion between the foamed rubber backing and the carpet backing such that the foamed rubber underlay could easily be pulled off the carpet backing. It was postulated that the small degree of cohesion of the foam and adhesion of the foam to the carpet backing was caused by the large cell size of the foam cells in these foam rubbers as well as by the irregularity in the size of the cells throughout the foam. The large foam cell size as well as the irregularity in the foam cell size was especially prevalent in the interface between the foam rubber and the carpet backing. It was thus desirable to add an additive to the foam rubber latex which would control the cell density and cell size and provide a more uniform distribution of cell size so that a high degree of cohesiveness of the foam and adhesiveness of the foam to the carpet backing could be provided.

It is thus one object of the present invention to add an additive to foam rubber latex which will lower the surface tension of the latex and promote small cell size.

It is another object of the present invention to add an additive to foam rubber latex which will promote a uniform distribution of foam cells having uniform cell size.

It is yet another aim to add an additive to foam rubber latex which will tend to maintain the latex foam in a foamed condition and prevent the foam cells from agglomerating prior to curing.

These and other objects of the present invention will be obtained in accordance with the disclosure described below.

SUMMARY OF THE INVENTION

In accordance with the present invention there is provided a foam rubber-backed carpet fabric comprising a textile carpet layer and a foam rubber layer in intimate contact with said textile carpet layer; the improvement in which there is included in said foam rubber layer a trifunctional polysiloxane having the formula:

$$R'_a R_b SiO_{(4-a-b)/2} \quad (1)$$

or the formula:

$$R'_c R_d (OH)_e SiO_{(4-c-d-e)/2} \quad (2)$$

or a difunctional polysiloxane of the formula:

$$R^2_f R^3_g SiO_{(4-f-g)/2} \quad (3)$$

wherein R, R' represent monovalent hydrocarbon radicals of up to 14 carbon atoms, $R^3$ represents monovalent hydrocarbon radicals of up to 14 carbon atoms other than alkyl, aryl, cyanoalkyl, aminoalkyl and alkylhydroxy and $R^2$ represents the same radicals as $R^3$ including the hydroxy radical and wherein $a$ varies from 0.05 to $3.3 \times 10^{-5}$, $b$ varies from 2.05 to 2.00, $c$ varies from 0.05 to $3.3 \times 10^{-5}$, $d$ varies from 1.91 to 2.00, $e$ varies from 0.14 to $9.9 \times 10^{-5}$, $f$ varies from 0.25 to $1.9 \times 10^{-5}$ and $g$ has a value of 2.00.

The above polymers of formulas (1), (2) and (3) have a substantial amount of cyclics intermixed with the linear polymers. Generally, the polymers may have 25–75 mole percent of cyclics intermixed with the linear polymers.

The above polysiloxanes may be added to the rubber latex in emulsion form containing an anionic or non-ionic type of surfactant selected from the group consisting of alkyl sulfonated, alkylarl sulfonated, alkyl polyether sulfonated, alkylaryl polyether sulfonated, alkyl sulfated, aryl sulfated, alkylaryl sulfated, alkyl polyether sulfated, alkylarly polyehter sulfated, alkyl sulfosuccinate, aryl sulfosuccinate alkylaryl sulfosuccinate dialkylsuccinate and fatty acid, alcohol amide sulfosuccinate etc.

DETAILED DESCRIPTION OF THE PREFERRED EMBODIMENT

The radicals R and R' in formulas (1) and (2) represent radicals of not more than 14 carbon atoms and preferably of not more than 8 carbon atoms if the polysiloxane is to have a viscosity in the desired range. Preferably the polysiloxane of formulas (1) and (2) has a viscosity in the range of 20 to 100 centistokes.

In the above formulas (1) and (2), R and R' can be, for example, mononuclear and binuclear aryl, such as phenyl, naphthyl, benzyl, tolyl, xylyl, 2,6-di-t-butylphenyl, 4-butylphenyl, 2,4,6-trimethylphenyl, biphenyl and ethylphenyl; halogen-substituted mononuclear and binuclear aryl, such as 2,6-dichlorophenyl, 4-bromophenyl, 2,5-di-fluorophenyl, 4,4'-di-chlorobiphenyl, 2'-chloronaphythyl, 2,4,6-trichlorophenyl and 2,5-dibromophenyl; nitro-substituted mononuclear and binuclear aryl, such as 4-nitrophenyl and 2,6-di-nitrophenyl; alkoxy-substituted mono and binuclear aryl, such as 4-methoxyphenyl, 2,6-dimethoxyphenyl, 4-t-butoxyphenyl, 2-ethoxyphenyl, 2-ethoxynaphthyl and 2,4,6-trimethoxyphenyl; alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologs and isomers of alkyl of preferably not more than about 8 carbon atoms; alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologs and isomers of alkenyl of preferably not more than about 8 carbon atoms; alkynyl such as propargyl, 2-butynyl and the various homologs and isomers of alkynyl of not more than about 8 carbon atoms; haloalkyl such as chloromethyl, iodomethyl, bromomethyl, fluoromethyl, chloroethyl, iodethyl, bromoethyl, fluoroethyl, trichloromethyl, diiodoethyl, tribroomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4-dichloromethylhexyl, 2,4-dichlorooctyl, 2,4,4-trichloromethylpentyl, 1,3,5-tribromooctyl and the various homologs and isomers of haloalkyl of preferably not more than about 8 carbon atoms; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethyl-pentenyl-4 and the various homologs and isomers of haloalkenyl of preferably not more than about 8 carbon atoms; haloalkynyl such as chloropropargyl, bromopropargyl and the various homologs and isomers of haloalkynyl of preferably not more than about 8 carbon atoms; nitroalkyl such as nitromethyl, nitroethyl, nitro-n-propyl, nitro-n-butyl, nitropentyl, 1,3-dinitroheptyl and the homologs and isomers of nitroalkyl of preferably not more than about 8 carbon atoms; nitroalkenyl such as nitroallyl, 3-nitro-n-butenyl-1, 3-nitro-n-heptenyl-1, and the various homologs and isomers of nitroalkenyl of preferably not more than about 8 carbon atoms; nitroalkynyl such as nitropropargyl and the various homologs and isomers of nitoralkynyl of preferably not more than about 8 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl, ethoxyethyoxy and the various heomlogs and isomers of alkoxyalkyl and polyalkoxyalkyl of preferably not more than about 8 carbon atoms; alkoxyalkenyl and polyalkoxyalkenyl such as ehtoxyvinyl, methoxyallyl, butoxyallyl, methoxy-n-butenyl-1, butoxy-n-pentenyl-1, methoxyethoxy-n-heptenyl-1, and the various homologs and isomers of alkoxyalkenyl and polyalkoxyalkenyl of preferably not more than about 8 carbon atoms; alkoxyalkynyl and polyalkoxyalkynyl such as methoxypropargyl and the various homologs and iosmers of alkoxyalkynyl and polyalkoxyalkynyl of preferably not more than about 8 carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4-dichlorocyclohexyl, 2,6-dibromocycloheptyl, 6-methoxycylooctyl, 2-nitrocyclopentyl, 1-cyclopentenyl, 3-methyl-1-cyclopentenyl, 5-methoxy-1-cyclopentenyl, 3,4-diemthyl-1-cyclopentenyl, 2,5-dimethoxy-1-cyclopentenyl, 5-methyl-5-cyclopentenyl, 3,4-dichloro-5-cyclopentenyl, 5-(tert-butyl)-1-cyclopentenyl, 2-nitro-1-cyclohexenyl, 1-cyclohexenyl, 3-methyl-1-cyclohexenyl, 3,4-dimethyl-1-cyclohexenyl and 6-methoxy-1-cyclohexenyl; cyanoalkyl such as cyanomethyl, cyanoethyl, cyanobutyl and cyanoisobutyl; alkylamine; alkenylamine, alkylcarboxy; alkenylcarboxy, alkoxycarboxy esters; and polyalkoxycarboxy esters.

The radicals $R^2$ in formula (3) represent the same groups as R, R' with the exception of alkyl, aryl, cyanoalkyl, aminoalkyl, and hydroxyalkyl. In addition, $R^2$ can represent a hydroxy radical so that the polymer of formula (3) can be a silanol. Again, the radicals $R^2$ and $R^3$ have generally 14 carbon atoms or less and preferably 8 carbon atoms or less so that the compounds of formula (3) will have a viscosity in the range of 20 – 100 centistokes. It was discovered that polysiloxanes of formulas (2) or (3) within this range of viscosities set forth above produced good emulsions which were acceptable in controlling the foaming of rubber latex.

Examples of compounds within formulas (1), (2) and (3) which were found to have acceptable foam controlling properties were:

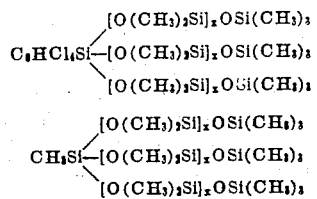

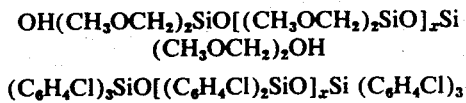

$OH(CH_3OCH_2)_2SiO[(CH_3OCH_2)_2SiO]_xSi(CH_3OCH_2)_2OH$ $(C_6H_4Cl)_3SiO[(C_6H_4Cl)_2SiO]_xSi(C_6H_4Cl)_3$

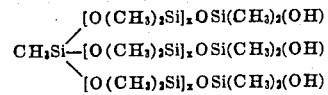

The compounds of formula (1) were prepared by hydrolyzing an organotrichlorosilane of the formula:

$R'SiCl_3$

(4)

a diorganodichlorosilane of the formula:

$R_2SiCl_2$

(5)

and a triorganochlorosilane of the formula:

$$R_3SiCl \quad (6)$$

The hydrolyzed products of formulas (3), (4) and (5) are dried by preferably being mixed with a hydroscopic filler. The filler is filtered out to leave the dried products. The dried hydrolyzed products are then equilibrated in the presence of KOH or sulfuric acid in that either a strongly acidic or strongly basic catalyst can be used. Preferably, a solvent is not used in the equilibration and preferably 0.5 to 2.0 parts by weight of $H_2SO_4$ is used per part of the reaction mixture. Although the reaction is endothermic, the reaction mixture is heated at a temperature within the range of 50° – 180°C for generally 1 to 12 hours and preferably 1 to 3 hours. The $H_2SO_4$ catalyst may advantageously be added as Fuller's Earth treated with $H_2SO_4$ so that after the equilibration has reached completion it can be removed by filtration. The acid is then filtered off and any remaining acid in the reaction mixture is neutralized with $NaHCO_3$. The water phase is separated from the organic phase and the organic phase is then put in a distillation column. Effluent is devolatilized from the organic phase until the residue has a viscosity within the range of 20–100 centistokes. The remaining product was analyzed and found to fall within the scope of formula (1). Although a product of formula (1) of more than 100 centistokes viscosity can be used, it was found that best results were obtained when the viscosity was within the above range. If the viscosity is below 20, then a portion of this polysiloxane will evaporate during curing so that there will be insufficient polysiloxane to control the latex foam.

The polysiloxane of formula (2) is prepared by reacting the hydrolyzed products of the compounds of formulas (4) and (5) in the presence of 0.5 to 2.0 parts by weight of $H_2SO_4$ per part of the reaction mixture. The rest of the reaction conditions and procedure is the same as that used to form the compounds of formula (1). The reaction mixture present after the equilibration reaction is completed is neutralized with $NaHCO_3$ and the water phase separated from the organic phase. The organic phase may additionally be washed with water and the water phase separated from the organic phase. The organic phase is then filtered to remove additional impurities and then put on a distillation column. Effluent is distilled off until the residue has a viscosity within the range of 20 to 200 centistokes. The resulting residue product was analyzed and found to be within formula (2).

The polysiloxane of formula (3) is prepared by hydrolyzing the compounds of formulas (5) and (6) as mentioned previously. The hydrolyzed products of formulas (5) and (6) are then equilibrated in the presence of $H_2SO_4$ as the catalyst. The reaction is carried out generally at a temperature range of 80° – 220°C for 1 to 3 hours. After the equilibration reaction is complete the acid is filtered off if present as a solid. The remaining acid is neutralized with $NaHCO_3$ and the aqueous phase is separated. The organic phase may then be washed with water to separate out all impurities soluble in the aqueous phase which is then separated from the organic phase. The organic phase is then placed on a distillation column to distill off effluent until the residue has a viscosity within the range of 20 – 100 centistokes. The residue product analyzed to have a structure within formula (3). Although a viscosity higher than 100 centistokes can be tolerated, it was found that best results were obtained in the above viscosity range. If the viscosity is below 20 centistokes, then polysiloxane evaporates during curing, yielding a foam rubber having weak tear resistance.

In order to obtain the advantageous result of using the compounds of formulas (1), (2) and (3) in latex formulation, the compounds were preferably added to the latex in emulsion form. The criteria for choosing a surfactant that could be used in such an emulsion are that the surfactant would produce a stable silicone emulsion with a fine particle size, that the surfactants would be chemically compatible with the types of surfactants commonly used in rubber latex emulsions and that the surfactant would promote and enhance the distribution of the silicone in the latex systems and therefore aid the silicone in the control of the cell size in the foam as the latex was frothed, gelled and cured.

Emulsions have been prepared based on both nonionic and anionic surfactants and have found success in this application. However, anionic surfactants of the sulfate and sulfonated types were found to be most suitable. These surfactants have the general formulas:

(7)

(8)

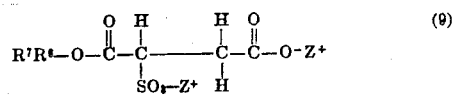

(9)

wherein Z represents an alkali or alkaline earth metal or a primary, secondary or tertiary amine or an organic cation radical, and $R^5$, $R^6$, $R^7$ represent mononuclear and binuclear aryl, such as phenyl, naphthyl, benzyl, tolyl, xylyl, 2,6-di-t-butylphenyl, biphenyl and ethylphenyl; halogen-substituted mononuclear and binuclear aryl, such as 2,6-di-chlorophenyl; nitro-substituted mononuclear and binuclear aryl such as 4-nitrophenyl; alkoxy-substituted mononuclear and binuclear aryl such as 4-methoxyphenyl; alkyl such as decyl and dodecyl, oleic, lauric and other long chain fatty acid alkyl groups; haloalkyl such as bromooctyl, iodooctyl; nitroalkyl such as nitrodecyl; alkoxyalkyl and polyalkoxyalkyl such as methoxyheptyl; cycloalkyl and alkyl, halogen, alkoxy and nitro-substituted cycloalkyl such as cyclononyl, 6-methoxycyclooctyl; cyanoalkyl such as cyanononyl; alkylaryl such as benzyl; aryl polyether; alkyl polyether; alkylaryl polyether; alkylamino and alkylcarboxyl. The radical $R^8$ represents alkylene radicals and aminoalkylene radicals. The radicals $R^5$, $R^6$, $R^7$ have at least 6 carbon atoms and preferably at least 10 carbon atoms.

Some examples of the compounds of formulas (7), (8) and (9) are:

$CH_3(CH_2)_{14}CH_2OSO_2O^-Na^+$ $C_6H_5OSO_2O^-Na^+$ $CH_3(CH_2)_{14}CH_2(C_6H_4)SO_2O^-Na^+$ $CH_3(CH_2)_{12}CH_2(C_6H_4)O(CH_2CH_2O)_{20}CH_2CH_2OSO_2O^-Na^+$ $CH_3(CH_2)_{12}CH_2(C_6H_4)-O(CH_2CH_2O)_{20}CH_2CH_2SO_2O^-Na^+$

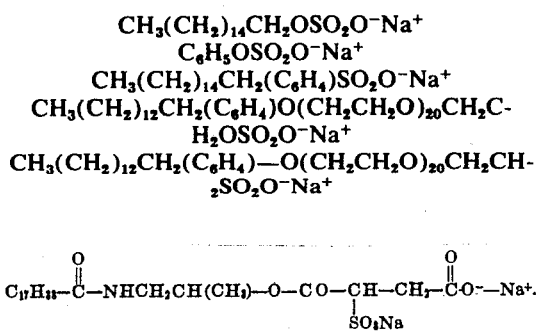

Other examples of surfactants suitable in the present invention are the isopropanol amine salt of dodecylbenzene-sulfonate; sodium lauryl triethoxy sulfate; the ammonium salt of nonyl phenoxytetraethoxy sulfate; the sodium salt of octylphenoxy monoethoxy sulfate; the sodium salt of nonyl phenoxy tetraethoxy sulfate; the sodium salt of t-octyl phenoxy triethoxy sulfonate; N-hydroxy ethyl, N-oleyl di-sodium sulfosuccinate; the sodium salt of dinonyl sulfosuccinate; sodium salt of t-octyl phenoxy triethoxy sulfonate; sodium salt of octyl phenoxy, triethoxy sulfonate; a proprietary blend of sodium salts of sulfated alcohols sold under the name of Sipex FA-38 by the Alcolac Chemical Company; G-3300 isopropanol amine salt of an alkylaryl sulfonate manufactured by Atlas Chemical Co.; a proprietary blend of sodium salts of various sulfated alkyl polyethers sold under the name Sipex JKB by the Alcolac Chemical Company; and solfonate salt of a tall oil fatty acid ester of triethanolamine.

These surfactants of formulas (7) and (8) are prepared by reacting fatty alcohols of the formulas:

$R^5 OH$ (10)

and $R^6 OH$ (11)

with concentrated $H_2SO_4$ or $H_2SO_3$ and then neutralizing this product with KOH or NaOH.

The surfactants of formula (9) were generally obtained by reacting an amino alkanol of the formula $R^8 OH$ (12)

with succinic acid and then reacting the product with a fatty acid. The resulting product is then neutralized with NaOH or KOH to produce the final surfactant product.

The latex material comprises an emulsion having therein a polymeric compound dispersed in the form of small particles in a water medium. The polymeric compound may be selected from any rubber including natural rubber and synthetic rubbers. Synthetic rubbers that are suitable are elastomeric homopolymers of conjugated dienes such as isoprene, butadiene, 2-chlorobutadiene and their copolymers with such others or with various monoethylenically unsaturated monomers such as styrene and acrylonitrile. Copolymers of styrene and butadiene and containing about 10 to 40 percent by weight styrene and 90 to 60 percent by weight butadiene as well as natural rubber which is polysiopropene are often found in such latices.

These polymers are emulsified, usually by emulsion polymerization of the monomers, into very fine particles dispersed in water. Typical emulsions contain about 62 to 85 percent by weight rubber solids. The latex also includes conventional additives such as vulcanizing agents like sulphur, accelerators, gel inducing agents, tack reducing agents, inert fillers, antioxidants, dispersing agents and pigments.

A typical latex formulation is as follows:

| Part A, Component | Parts/100 Dry Rubber Solids |
|---|---|
| Cold SRB latex | 0 – 100 |
| Natural latex | 0 – 100 |
| Stabilizer Soap | 0.5 – 10 |
| Antioxidant | 0.5 – 5 |
| Accelerator | 0.5 – 8 |
| Additional stabilizer | 0.5 – 8 |
| Inert Filler | 0 – 200 |

| Part B, Cure Grind | Parts/100 Dry Rubber Solids |
|---|---|
| Zemite Special (50 percent) (Vulcanizing Agent) | 0.5 – 4 |
| Zinc Oxide Dispersion (60%) (Vulcanizing Agent) | 3 – 12 |
| Sulfur Dispersion (68% (Vulcanizing Agent) | 1 – 5 |
| Carbon Black Dispersion (Color and Strength Additive) | 0 – 3.0 |

| Part C Gel | Parts/100 Dry Rubber Solids |
|---|---|
| 10% Tetra Sodium Pyrophosphate Solution | 0.1 – 0.7 |
| 10% Potassium Hydroxide Solution | 0.01 – 1.0 |
| Reagent Grade Ammonium Hydroxide | q.s. |
| 25.4% Ammonium Acetate Solution | 0.8 – 1.5 |

There are two basically different techniques for producing foam rubber. In one technique a gas liberating compound is added to the latex. The compound is capable of releasing gas by decomposing when it is heated. After the foam is deposited on the back of the carpet, it is heated to liberate the gas and cure the foam. Gelation is caused by the addition of the gel which breaks the emulsions and causes the rubber particles to adhere to each other. If a gas liberating compound is used in the latex, it should have a decomposition temperature below the gelation temperature so that it will decompose upon being heated to foam the latex. When the temperature is raised even further, the foam will gel trapping the gas bubbles present in the foam. After gelation, the rubber is cured by further heating. Usually the gelation temperatures are between 25° to 121°C while the curing temperatures are between 121° to 165°C.

The second method of foaming foam rubber involves mechanically agitating the latex so that air is introduced into the latex to form a froth. After foaming, the latex is gelled and cured as described above. Both of these methods are wel well to those skilled in the art so that it is unnecessary to describe the systems in detail. Further, the mechanical method is adequately described in the examples appended to this description. Further details as to the methods may be obtained from standard textbooks.

The fabrics to which the foam backing may be applied may be any known fiber or filament. Fibers which are suitable in the carpets to which the foam backing is applied are rayon, polyester such as polyethylene triphthalate, nylon such as Nylon 6, Nylon 6b and Nylon 11, polyarcylonitrile, copolymers of acrylonitrile and other monomers such as vinyl chloride, polyolefins such as polyethylene or polypropylene, especially copolymers of vinyldiene chloride and vinyl chloride, as well as natural fibers including wool and cotton. The backing material may be any woven or otherwise formed fabric and a plastic fiber or non-woven fabric. A woven jute backing was found to be especially suitable as a backing for foamed rubber. A latex-based pre-coat or "scrim" is also used to hold the fibers or filament yarns in place after they are tufted into the primary backing.

It was discovered that the type of surfactant used in the emulsion as well as the foam density of the cured rubber foam had an effect on the tear resistance between the carpet backing and the rubber foam. As pointed out previously, the anoionic sulfonate and sulfate type of surfactant described above resulted in a good latex emulsion that produced a foam backing with high tear resistance. For test purposes in the examples set forth below, a foam density in the range of 17 – 20/lbs/ft$^3$ was used.

The emulsion of the compounds of formulas (1), (2) and (3) with water and a surfactant were prepared by means of a colloid mill or homogenizer. Generally, about 0.5 to 5 per cent by weight of surfactant based on the weight of the emulsion is used to form the emulsion and preferably 1.4 to 3.0 percent by weight is used. If less surfactant is used, a stable emulsion is not formed. If more than 5.0 percent surfactant is used, then the additional surfactant does not aid the dispersion of the particles or the stability of the emulsion but does add unnecessarily to the expense of producing the emulsion.

Sufficient silicone emulsion is added to the rubber latex so that generally 0.05 to 0.40 percent by weight of the polysiloxane of formulas (1), (2) or (3) is present based on the weight of the dry rubber foam solids and preferably 0.1 to 0.25 percent by weight of the polysiloxane is present. If more polysiloxane is used, then the polysiloxane excessively breaks down the foam so that a good foamed rubber is not formed as well as considerably increasing the cost of producing the foam rubber. If less than 0.05 percent polysiloxane is used, then there is not sufficient control over the foam cell size and a uniform distribution of the foam cell size is not obtained.

The following examples are intended to illustrate the invention and are not intended to limit the scope of the invention in any way. All parts are by weight unless otherwise indicated.

Example 1

A typical ammonium acetate gel latex compound was prepared according to the following formulation:

| Part A of Compound Component (In Order of Addition) | Dry Parts/100 Parts Rubber Solids |
|---|---|
| Firestone X2B Natural Latex (62% | 40 |
| Potassium Oleate (20%) | 0.5 |
| Firestone FRS-230 - SRB Synthetic Latex | 60.0 |
| Potassium Oleate (20%) | 1.0 |
| Naugawhite (40%) | 1.5 |
| Trimene Base (50%) | 1.0 |
| Ethyl Zymate (50%) | 1.0 |
| LU-400 Filler | 95.0 |
| Part B Cure Grind Component (In Order of Addition) | % |
| Zenite Special (50%) | 13.8 |
| Zinc Oxide Dispersion (60%) | 57.2 |
| Sulfur Dispersion (68%) | 22.1 |
| Alcoblack M-Carbon Black | 6.9 |
| Part C Gel | % |
| 10% Tetra Sodium Pyrophosphate Solution | 30.1 |
| 10% Potassium Hydroxide Solution | 5.7 |
| Reagent Grade Ammonium Hydroxide | 23.9 |
| 25.4% Ammonium Acetate Solution | 40.3 |
| Additional Ammonium Hydroxide | q.s. |

Using a model N–50 Hobart Mixer with wire whip and a stainless stell steel the latex was compounded by mixing 256 wet parts of Part A with 14 wet parts of Part B. The mixture was frothed at the high velocity speed in the N–50 mixer for 50 seconds. Then 12 wet parts of Part C gel plus additional parts, as needed, of ammonium hydroxide were added to the mixture. The mixture was then frothed at a medium velocity for 15 seconds. At the end of this period the gelled foam was refined by frothing at the low velocity for 60 seconds.

The foam was frothed to a wet density that, when cured, would give a density of approximately 16 – 20 pounds per cubic foot. The wet density was measured as the weight, in grams of a 3 oz. Dixie cup of the gelled uncured foam. Using the above formulation and procedure, a 28± 2 gram net cup weight would result in a cured foam having a density of 16 to 20 pounds per cubic foot. The refined gelled foam was checked at this point to determine whether it had the density stated above. Then after the 60 second period of refinement, the foam was poured on the back of an automobile carpet manufactured by the Dorsett Carpet Company. This carpet has a jute backing coated with a latex scrim. Steel bar stock of ¼ inch height was placed on the back of the carpet so as to act as a frame to contain the foam. The foam was doctored onto the back of the carpet and planed off to a height of approximately one-fourth of an inch. The gelled latex foam was cured for 25 minutes in an air circulated oven set at 300°F.

The cured foam was cut into sections for purpose of evaluation. The density of the foam was measured as well as the pounds of force required to delaminate the foam from a 6 inch by 1 inch coated section of carpet. The percent collapse of the foam upon cure was also measured, that is, the reduction from the wet coated foam height to the cured foam height. This value which varied between 8 – 20 percent was found to depend more on the age of the latices used and the strength of the gel than the type of silicone emulsion evaluated. In the present example where polysiloxane was not added to the latex, the density of the foam was 16.7 pounds per cubic foot and the percent collapse was 10 percent. The amount of force necessary to strip the rubber foam from a 1 inch by 6 inch strip of carpet was 0.9 pounds. The foam cell size was not uniform but irregular and there were large foam cells of irregular size at the interface between the foam rubber and the carpet backing.

Example 2

The same formulation of latex as in Example 1 was used except that prior to the addition of Parg C gel there was added to the mixture of Parts A and B a 50 percent emulsion of a linear difunctional dimethylpolysiloxane having a viscosity of 100 centistokes and emulsified with an anionic surfactant. The structure of the difunctional dimethylpolysiloxane may be: $(CH_3SiO[(CH_3)_2Si]_xSi(CH_3)_3$. The pertinent data as to the tests carried out are set forth in Table I below.

It is thus seen that when difunctional dimethylpolysiloxane is added in emulsion form to the latex formulation of Example 1, the tear resistance in pounds of force required to delaminate the foam rubber from the carpet backing increases considerably.

TABLE I

| Percent linear dimethylpoly-siloxane in emulsion | Type of surfactant | Percent surfactant based on weight of emulsion | Silicone as percent of dry rubber solids | Density of cured foam, lbs./ft.$^3$ | Lbs. force required for the delamination of the foam from a 1" x 6" strip of carpet |
|---|---|---|---|---|---|
| 50 | Isopropanolamine salt of dodecylbenzenesulfonate | 3.0 | 0.25 | 17.8 | 3.7 |
| 50 | Sulfonate salt of a tall oil fatty acid ester of triethanolamine | 3.0 | 0.25 | 17.6 | 2.0 |

Example 3

The same formulation of the latex in Example 1 was used except prior to the addition of Part C gel there was added to the mixture of Parts A and B a 50 percent emulsion of tris (trimethylsiloxypolydimethylsiloxy)tetrachlorophenylsilane which is a compound within formula (1) which may have the structure:

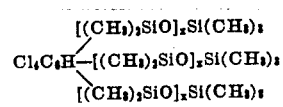

It is understood that various cyclics are present with the above linear polymer. The polysiloxane had a viscosity of 65 centistokes and was emulsified with anionic type of surfactant. The results obtained from two tests are tabulated in Table II below.

The results obtained by using trifunctional tris(trimethylsiloxypolymdimethylsiloxy)tetrachlorophenylsilane emulsion as compared to the results obtained using the difunctional dimethylpolysiloxane were on the average 22.8 percent higher. Thus, these examples demonstrate that the compound tested was considerably more effective in promoting uniform, small cell size in the foam rubber and especially at the interface between the foam rubber and the carpet backing to produce a much stronger bond there between.

Example 4

The same formulation of the latex as in Example 1 was used except prior to the addition of Part C gel there was added to the mixture of Parts A and B a 50 percent emulsion of tris (trimethylsiloxypolydimethylsiloxy)methylsilane which is a compound within formula (1) which may have the structure:

$$CH_3Si \begin{matrix} [O(CH_3)_2Si]_xOSi(CH_3)_3 \\ -[O(CH_3)_2Si]_xOSi(CH_3)_3 \\ [O(CH_3)_2Si]_xOSi(CH_3)_3 \end{matrix}$$

It is understood that various cyclics are present with the above linear polymer. This polysiloxane had a viscosity of 50 centistokes and was emulsified with anionic types of surfactant. The results of the tests are set forth below in Table III.

It is thus seen that the results obtained with the trifunctional emulsion are considerably better than the results obtained by using the difunctional dimethylpolysiloxane emulsion.

TABLE III

| Percent polysiloxane in emulsion | Type of surfactant | Percent surfactant based on weight of emulsion | Silicone as percent of dry rubber solids | Density of cured foam, lbs./ft.$^3$ | Lbs./force required for the delamination of the foam from a 1"x6" strip of carpet |
|---|---|---|---|---|---|
| 50 | Oleic acid isopropanolamide disodium sulfosuccinate | 1.4 | 0.15 | 18.9 | 3.9 |
| 50 | Sodium salt of octyl phenoxytriethoxysulfonate | 1.4 | 0.15 | 18.1 | 4.4 |

What is claimed is:

1. In a process for controlling the foaming of foamed rubber latex the improvement which comprises adding to said rubber latex a polysiloxane selected from the class consisting of a compound of the formulas:

$$R'_aR_bSiO_{(4-a-b)/2} \quad (1)$$

and $$R'_cR_d(OH)_eSiO_{(4-c-d-e)/2} \quad (2)$$

and frothing the resultant mixture of rubber latex and said polysiloxane, wherein R, R' represent a radical selected from the group consisting of mononuclear and binulcear aryl; halogen-substituted mononuclear and binuclear aryl; nitro-substituted mononuclear and binuclear aryl; alkoxy-substituted mononuclear and binuclear aryl; alkyl; alkenyl; alkynyl; haloalkyl; haloalke-

TABLE II

| Percent polysiloxane in emulsion | Type of surfactant | Percent surfactant based on weight of emulsion | Silicone as percent of dry rubber solids | Density of cured foam, lbs./ft.$^3$ | Lbs./force required for the delamination of the foam from a 1"x6" strip of carpet |
|---|---|---|---|---|---|
| 50 | Sodium salt of t-octyl phenoxytriethoxy sulfonate | 1.4 | 0.15 | 16.8 | 3.2 |
| 50 | Sodium salt of octyl phenoxytriethoxy sulfonate | 1.4 | 0.15 | 17.3 | 3.8 | nyl; haloalkynyl; nitroalkyl; nitroalkenyl; nitroalkynyl; alkoxyalkyl and polyalkoxyalkyl; alkoxyalkenyl and polyalkoxyalkenyl; alkoxyalkynyl and polyalkoxyalkynyl; cycloalkyl; cycloalkenyl and alkyl, halogen, alkoxy and nitro-substitued cycloalkyl and cycloalkenyl; cyanoalkyl, alkylamine; alkenylamine; alkylcarboxy; alkenylcarboxy; alkoxycarboxy ester; and polyalkoxycarboxy ester, all radicals having not more than 14 carbon atoms and wherein $a$ varies from 0.05 to $3.3 \times 10^{-5}$, $b$ varies from 2.05 to 2.00, $c$ varies from 0.05 to $3.3 \times 10^{-5}$, $d$ varies from 1.91 to 2.00 and $e$ varies from 0.14 to $9.9 \times 10^{-5}$.

2. In the process of claim 1 wherein said polysiloxane is added to said foam rubber latex in the form of an emulsion containing an anionic type of surfactant selected from the class consisting of alkyl sufonated, alkylaryl sulfonated, alkyl polyether sulfonated, alkylaryl polyether sulfonated, alkyl sulfated, alkylaryl sulfated, alkyl polyether sulfated, alkylaryl polyether sulfated, alkyl sulfosuccinate, dialkyl sulfosuccinate, aryl sulfosuccinate, alkylaryl sulfosuccinate, and fatty acid, alcoholamide sulfosuccinate.

* * * * *